United States Patent [19]
Altrogge

[11] 3,971,262
[45] July 27, 1976

[54] FRICTION GEAR

[76] Inventor: Wilhelm E. Altrogge, P.O. Box 8617, 8202 Schaffhausen, Switzerland

[22] Filed: Oct. 15, 1974

[21] Appl. No.: 514,743

[30] Foreign Application Priority Data
Oct. 17, 1973 Germany.............................. 2352014

[52] U.S. Cl. .................................... 74/227; 74/214
[51] Int. Cl.² ......................................... F16H 7/00
[58] Field of Search ............ 74/214, 215, 225, 226, 74/227

[56] References Cited
UNITED STATES PATENTS

| | | | |
|---|---|---|---|
| 1,319,109 | 10/1919 | Piez ...................................... | 74/227 |
| 2,781,667 | 2/1957 | Giskes................................ | 74/214 X |
| 3,548,673 | 12/1970 | Suchocki .............................. | 74/214 |
| 3,608,389 | 9/1971 | Christian............................... | 74/227 |
| 3,808,902 | 5/1974 | Grant..................................... | 74/227 |

*Primary Examiner*—John J. Camby

[57] ABSTRACT

The present invention provides a friction gear comprising a drive pulley operated by a motor, a driven ring disposed around the drive pulley and forming a friction zone between the inside surface of the ring and the pulley. A flexible tractive member, such as a rope, cable, chain or belt, extends around the outside periphery of the ring and is in frictional connection therewith, suitably in a groove, the member producing a pressure in the friction zone proportional to the tension in the tractive member. The gear operates in an analogous manner in both directions of rotation of the ring and may be used for example as an extremely simple garage door operator installed on the inside of the door per se. Disengagement between the drive pulley and the driven ring is possible in a simple manner by actuating from the outside of the gear an opposite movement to the pivoting ring. The ring can also be raised to come into contact with both of a pair of counter pulleys one of which counter pulleys being normally in contact with the outside of the ring during operation under load to produce a lever effect for creating the pressure in the friction zone. Such elevation brings the gear into a free-wheeling condition. The rings and pulleys may be provided with electric means to increase the extent of pivoting of the ring in either direction which extra pivoting may be used to actuate additional devices or electrical contacts to control the door in certain conditions of the gear such as in the final stages of movement of the door or in an overload condition of the gear.

9 Claims, 2 Drawing Figures

FRICTION GEAR

FIELD OF INVENTION

The present invention relates to a friction gear particularly for use in connection with power transmission by ropes, toothed belts or similar flexible tensile force tractive means where the pressure in the friction zone between the two wheels of the gear is automatically regulated by the pivotability of one of the friction wheels.

BACKGROUND OF INVENTION

A broad field of application for friction gears exists in the textile industry. Such gears greatly simplify the power transmission for many machines. A friction gear is however not capable of operating with large forces. The zone of contact between the two friction wheels is relatively small so that the permissible load is limited. The amount of the pressure required is determined by the tangential force to be transmitted, the friction coefficient and the security factor. Further, the specific pressure in the contact zone for a combination of rubber and metal has a value of only about 0.02 kp/mm$^2$. This value can however, be exceeded when the pressure time is short whence the work of rubber deformation cannot affect the temperature rise in the material structure of the contact zone to such a great extent. With rubber as one of the friction materials the friction coefficient of the moving surface is much lower in humid atmosphere. For a good power transmission under such conditions the minimum value of the vertical to the contact zone directed pressure force must be double the tangential force between the two friction wheels of the gear.

In the pressure zone of the rubber surface internal processes of material displacement occur with complex hydrodynamic components which the inventor has investigated, (see his paper: "To the law of mixed friction" Technical University Munich, Germany).

For automatic regulation of the pressure the driving wheel together with the motor is normally pivoted against the driven wheel which remains fixed. An inferior pressure force in the friction zone is sufficient for power transmission. With increasing load the driving wheel is forced against the driven one, so that increasing power consumption can be transmitted in the friction contact zone. Friction gears do not normally provide for a change of the sense of rotation because then the automatic pressure regulation is not more effective. The uncoupled state of the gear is obtained by displacing the driving wheel from the driven wheel or disengaging intermediate elements between the two friction wheels.

The present invention combines the friction gear with a drive by a flexible tensile force tractive element such as a belt or rope to provide for further uses thereof and practical possibilities independent of the tractive tensile force elements such as a rope being finite or continuous. The present invention also provides a gear having power transmission by friction contact between friction wheels and a drive for said wheels solely by tensile force means in which the disadvantages of the prior art are eliminated. The present invention also provides for automatic pressure regulation in the friction zones of the gear in both directions of rotation thereof. The present invention further provides a gear having a flexible tractive element such as a rope in which the functions of stopping in the final stages and overload conditions are automatically controlled. The gear construction is compact and does not need any significant service.

SUMMARY OF INVENTION

According to the present invention, the driven friction wheel, i.e. ring of the gear in secure power connection is surrounded by a flexible tractive force element such as a rope and the driven ring is pivotable in both directions on the driving pulley, so that it is automatically pressed with its own leverage effect due to the produced tractive force against the driving wheel.

The two friction wheels need not operate exactly parallel with their axles because the friction wheel which is desirably covered with rubber is able to adapt its structure in certain limits on the metal surface of the other friction wheel.

The driven ring is surrounded on more than half of its circumference by the flexible tractive element, so that the wheel can freely pivot with ±10° about a middle position which it assumes when the gear is unloaded. To have the driven wheel in the form of a ring is not only the best solution for the physical friction conditions but further, a ring requires less material and can be quickly changed. The ring lies with its inside surface in a simple manner on the driving wheel and can roll in a similar manner to a planetary gear. By means of the loop of rope surrounding the ring it is held by the tensile force on the driving wheel. The rubber covering is preferably attached on the inside of the ring than on the driving wheel. On the outside surface of the ring are means for the passage of the flexible tractive element, which may be a toothed belt or a ball chain. For these tractive members the ring must have deeper and higher formations in its outside surface.

When the gear is used for automatic doors a cuneiform groove for the rope on the outside surface of the ring provides a good friction connection. But as is known from aerial cableways for a rope of such a diameter all the other pulleys of the gear should not be too small. When the gear is used in a door operator with a rope of 3 millimeters diameter a secure friction connection and long life of the rope are guaranteed with a ring of 50 millimeters diameter. A rope has the important advantage of being adaptable for nearly all installation conditions.

In the unloaded state of the gear the pivot axis lies in the friction zone of the two wheels. If the two outside surfaces of the wheels were to be in contact the friction zone would be small. However with the inside surface of the ring in contact with the outside surface of the drive pulley a much greater friction zone is produced so that the power capacity is increased. Each of the two end portions of the rope leaving the ring must be slightly pre-loaded by a spring such that the gear can start operation with sufficient friction in the contact zone. These pre-loaded springs have a second function. In particular, each of the end portions of the rope continuously leaves the ring and the corresponding spring maintains the friction connection between the groove and rope secure.

When the gear is loaded causing a tractive force in one of the end portions of the rope, the ring in each of its directions of pivotability comes into contact on its outside surface with a corresponding counter pulley. Under the tensile force at the end portion of the rope a part of the ring forms an arm of lever for pressure in the friction zone of the two contacting friction wheels. The leverage provides in the friction zone a multiple value of the tensile force in a direction vertical to said zone. The limits for lever length adjustment are determined by the required slip conditions and overload of the gear. For the two directions of rotation a different length of lever arm is preferred when in one direction of transportation more power is required. The pressure force regulation in the friction zone occurs without any inertia, and thus the ring can directly follow all oscillations of power.

The pivoting movement of the ring does not desirably finish when its outside surface contacts a counter pulley. This movement may continue to a certain extent because one of the friction wheels is covered with an elastic material such as rubber. This effect can be increased by additional elastic means. The dependence of the pivotability of the ring under the load under elastic circumstances can be used for many control functions of the gear.

The counter pulleys are desirably elastic elements, their core desirably consisting of rubber. When the counter pulley is eccentric the same elastic effect can be achieved by pre-loading.

Between the driven ring and one of the counter pulleys an intermediate ring may be present which pivots under the power of the driven ring when the gear starts to operate. The movement of the intermediate ring can be employed for additional mechanical functions of the gear operation start. An element such as the intermediate ring disposed outside of the driven ring may also actuate an electrical contact. When mechanical or electrical functions dependent from the load in the two directions of rotation are needed, the driven ring due to its pivotability in both directions can produce them.

Because all gear operations are symmetrical the disengagement of the friction coupling is possible in both directions of rotation of the ring in a similar way. For this interruption of the force transmission between the two wheels, the ring must be pivoted back in an opposite direction. Only in the condition where the gear is stationary and is unloaded, the ring is lifted in a simple manner in the direction of the two counter pulleys to eliminate the friction contact in the friction zone.

The extent of the pivoting of the ring may be limited by side elements. With such side elements for a certain operation condition the over-loaded ring will slide in the friction zone. These elements on the side of the ring may be adjusted so that the axis of pivoting of the ring remains in the friction zone. At this moment the gear slides substantially unobstructed by some starting friction. This is a condition which can be eliminated by the motor to create an automatic coupling of the gear.

Another but not complete disengagement of the friction coupling is possible when the axles of ring and driving wheel are inclined with respect to each other. However, this has the disadvantage that the rubber under excess specific power stress may be destroyed. The following solution needs very small control forces. It is yet effective if the rope in a position of rest is over-loaded. This situation occurs under conditions where an automatic door equipped with the gear is inoperable because the current to the motor is interrupted. Then the door must be movable by hand without resistance.

For an optimum loop effect a pulley is required before the rope leaves the case of the gear at the top thereof. It is thus easy to turn back the tractive force to the ring. By this internal force compensation a friction connection is no longer possible. For the compensation the upper quadrant of the unloaded ring side is preferably where the point for the most effective opposite moment of pivoting occurs. The control force is low, a small notching attachment being needed.

Generally analogous to the aforesaid device, the ring can be slewed back by an exterior resistance during its operational movement. By this mechanical control method on a sliding door equipped with the gear the electrical contacts for the end positions and the bounce contact are no longer needed. Just a timing relay in the motor can stop the motor during unloaded sliding of the gear. The system is practical for industrial and garden doors where in a rough atmosphere sensitive outside contacts cause some difficulties in controlling the final movements of the door.

DESCRIPTION OF PREFERRED EMBODIMENTS OF THE INVENTION

Figure 1:
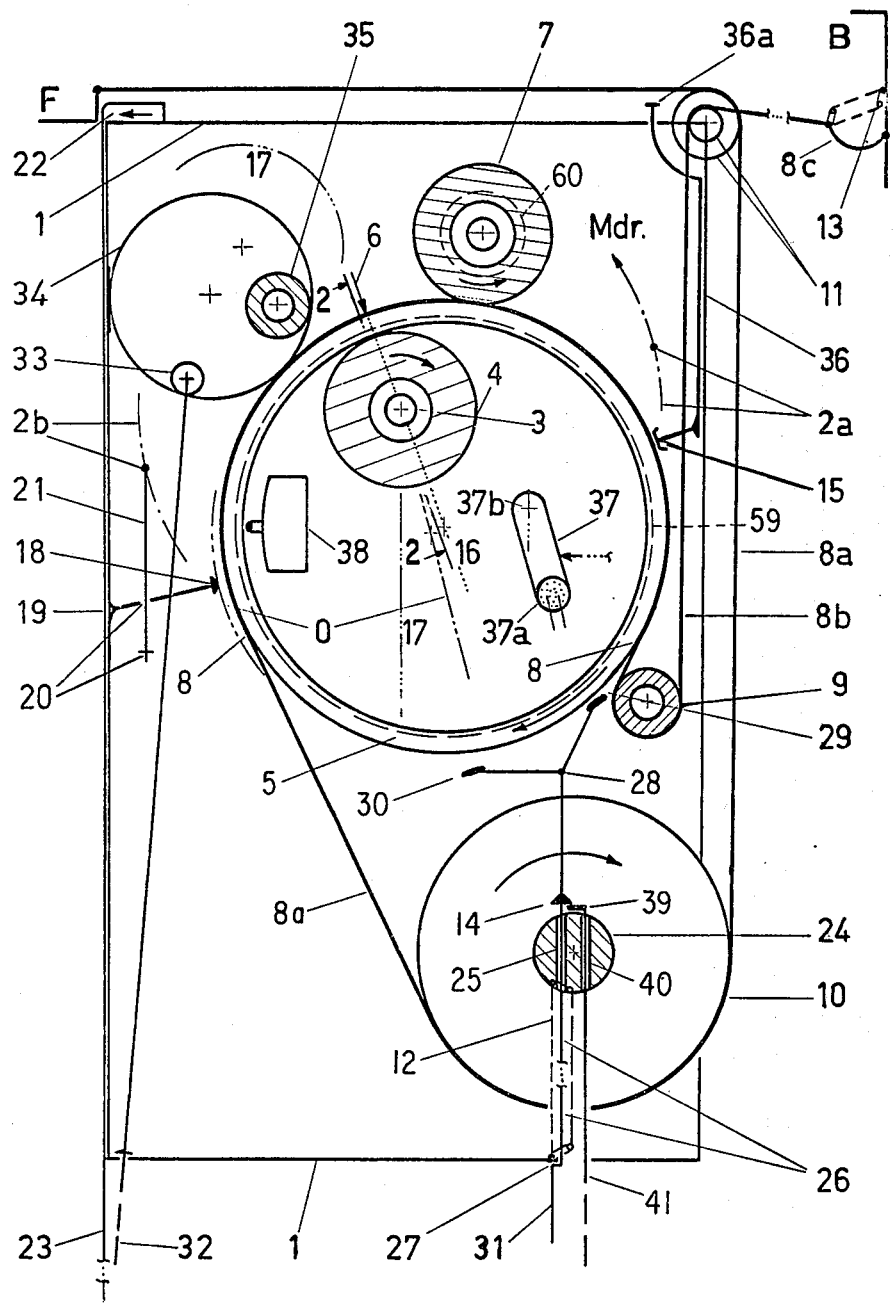
Figure 2:
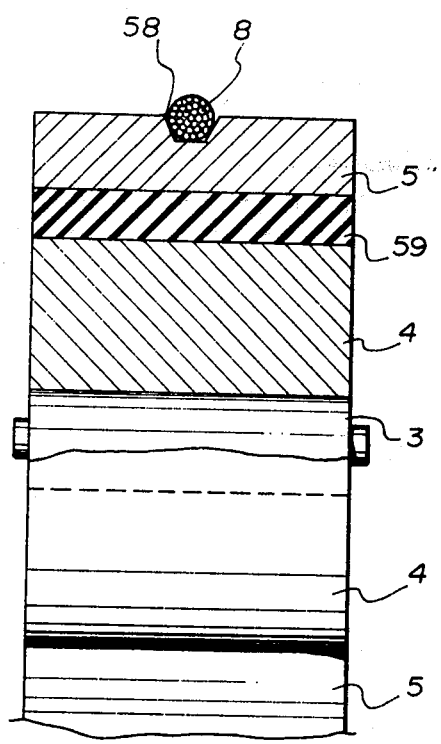

The present invention is further described particularly with reference in its operation of an automatic door by way of the accompanying drawings in which:

FIG. 1 is a vertical section through a friction gear according to one embodiment of the present invention, and FIG. 2 is a detail section taken along the line 2—2 in FIG. 1.

For a better understanding, certain construction details have been left out of the drawings. Referring to FIGS. 1 and 2 the gear is disposed in case 1. The movable housing 2 of the motor for driving the gear is only delineated by the two edges 2a and 2b.

The motor axle 3 extends deeply into the case 1. The driving pulley 4 can thus be mounted on the axle 3. The driven friction ring 5 has arrived at a position just before stopping of the gear. The four direction arrows show the relative movements of the door frame 22, drive pulley 4, ring 5 and counter pulley 7. The door frame 22 is just touching the overhead front wall F of the garage. The pressure zone 6 shown by the arrow for the vertical directed force is still loaded as shown by the pivoted position of the ring 5 with its axial line 16 in contact with the counter pulley 7. The friction zone 6 has a large size because the pulley 4 is 3 times smaller than the ring 5.

The loop of a rope 8 is clamped in a groove 58 of cuniform profile in the outside surface of the ring 5 which ensures constant friction conditions between the rope 8 and the ring 5 which is enhanced as will be explained later in the springs 12 and 13. The rope leaves the ring 5 tangentially with the two end portions 8a and 8b. These end portions 8a and 8b change direction on leaving the case 1. The stationary pulley 9 has in practice about the same size as the tensile force pulley 10. The end portion 8a of the rope 8 surrounding pulley 10 is under power tensile stress. Both rope end portions 8a and 8b pass over stationary twin pulley 11 to provide a horizontal transport direction. The end portion 8b, for clarity shown interrupted is some meters long and fixed on the back wall B of the garage. The intermediate portion 8c of the rope 8 shows that no tensile force from the gear at the particular moment. The rope end 8a is attached to the overhead wall F over the overhead door 22. In this way the friction gear can pull itself along the rope 8, which is installed in the garage beneath the ceiling. For the disengaged state of the gear the middle position of the ring 5 is defined by the line O. In this position the two rope end portions 8a and 8b are pre-loaded substantially by the same amount by the corresponding springs 12 and 13, to produce a rest friction for the start of operation of the gear in zone 6. In the loaded condition of the gear as shown pulley 10 is fixed in its highest position, toughing point 14 so that the spring 12 has no function. The spring 13 assists the friction contact of the loop of the rope 8 in the grooves 58 of the ring 5. The counter pulley 7 also presses the rope 8 into the groove 58 of the ring 5. The ring 5 must thus slide in the friction zone 6 when the gear has reached a desired load limit. For this an element with the slide piece 15 is provided on the side of the case 1. A similar element 15 on the left side of the ring 5 is no shown for clarity.

The driven ring 5 is surrounded on more than half its circumference by the loop of the rope 8 whereby the freely mounted ring 5 may pivot with an approximately 20° angle with the loop of the rope 8. The ring 5 may be changed very quickly because there is no bearing merely lying on the driving pulley 4 and held by the tensile force in the rope 8. A rubber covering 59 is provided on the inside of the ring 5. However such covering 59 could be attached to the driving pulley 4. The ring 5 is pivotable in both directions, i.e. to the right or left as shown in the drawings of the middle line O which defines the unloaded condition of the gear. In general friction gears do not allow a change in the direction of rotation thereof because the automatic pressure regulation effect is in one direction only. With the gear shown in the drawings, the automatic increasing pressure effect in the friction zone 6, the hereinafter described control functions and disengagement of the friction coupling are possible in the two directions of rotation of the shaft 3 and pulley 4.

As stated above to start the friction gear, each of the end portions 8a and 8b are pre-loaded to a small extent because the friction gear requires a minimum pressure in the friction zone 6. In the position defined by the line O both the springs 12 and 13 produce a rest friction for starting the gear. In the condition of the gear shown in FIG. 1 the spring 13 is not under much tension and the portion 8c of the rope 8 hangs down, the end portion 8b not being under tension. Essentially all the tractive force is in the end portion 8a of the rope 8. By means of its own lever arm, the ring 5 under the tractive force of the end portion 8a leaving the ring 5 is pressed in the friction zone 6 against the pulley 4, with the counter pulley 7 acting as an outer counter element. In the opposite direction of rotation of the pulley 4 on opening the door the counter pulley 35 with its associated intermediate ring forms a counter element for the lever arm under the tractive force of the end portion 8b leaving the ring 5. This leverage produces a multiple value of the tensile force in the friction zone 6. The gear can thus react to all oscillations of the power fed thereto in a direct manner.

The ring 5 after contactng one of the counter pulleys 7 or 35 can be further pivoted under increasing load due to the counter pulley being provided with elastic means such as a rubber core 60. A similar effect is also produced by the additional intermediate ring 34 on the stationary pulley 35.

As aforesaid, the unloaded condition of the gear is shown by the line O. The pivot angle of the ring 5 to the left is only half that to the right as will be seen from lines 16 and 17. Line O corresponds with the circle going through the slide piece 18. This slide piece 18 operates with the automatic coupling controlled by the motor per se. When the driving pulley 4 rotates in a clockwise direction, the movable motor housing 2 turns under load in the opposite direction. This reaction moment Mdr is stopped when the motor housing 2 has reached a particular point on a motor plate (not shown).

With the reaction moment Mdr of the motor housing 2 a slide piece on the right side of the ring 5, similar to slide piece 18, is raised by the edge 2a. In this manner the friction contact for the rotation in the drawing remains unobstructed, because ring 5 can freely pivot. In a subsequently rest condition of the gear this slide piece assumes the complementary similar position to the end piece 18, so that the gear is not friction coupled.

The slide piece 18 is mounted on a blade spring 19. In the condition of the gear shown in the drawing the dappet 20 of the shaft 21 which is attached to the motor housing edge 2b is in its lowest position passing through the blade spring 19. Additional to the automatic engagement of the friction wheels the reaction moment of the movable motor housing 2 causes a substantially free wheel effect in the gear. When an external acceleration occurs outside the gear, the position of slide element 18 in the drawing does not change. The driving pulley 4 rotates further in a clockwise direction. However, with the external foreign tractive force on the end portion 8b of the rope friction connection in the zone cannot be produced.

In FIG. 1 of the drawings the frame 22 of the overhead door has just arrived at the wall F. Inside on the door plate 23 the case 1 is installed. The tensile force pulley 10 is much more movable in the vertical direction than is shown in the drawings. The pulley 10 slides in the guide 25 of axle 24 on rod 26. The downward movement occurs when the rope end portion 8b, 8c is put under tension. At the same time, the end portion 8a of the rope together with the spring 12 ensured friction in the groove 58 of ring 5. In the condition shown in the drawings, where the pulley 10 is fixed by the stop element 14, the catch 27 may be released from the edge of the case 1. Then the slide piece 29 above the point 28 contacts the outside surface of ring 5 to neutralize the internal forces in the gear. When the door is moved by hand, ring 5 pivots to the left. When the catch 31 is moved further towards the inside of the case 1, the slide piece 30 also contacts the ring 5. The friction connection in the two directions of rotation thus remains interrupted and the overhead door 22 with no obstruction anywhere hindered is manually movable.

Simple door locking devices may be installed above on the frame 22 of the overhead door. Such a device is actuated by a rope 32, having at one end thereof in the case 1 a small roll 33 located on the surface of the intermediate ring 34. When the gear begins to operate to open the door, ring 5 pivots to the left and displaces the ring 34 with considerable power into its upper position corresponding to the circle 17. As is required a maximum of force is initially produced and actuation of the lock device is very fast.

The gear can be stopped by an external pressure on the ring 5 by moving the degree of pivoting thereof back. On the right side of the case 1 a rod 36 is movable with the slide piece 15 when the plate 36a outside the case 1 is pressed down. The gear can thus be disengaged in its friction coupling by external means contacting plate 36a and installed on a point in the transporation path of the gear. This disengagement words with absolute certainty because the object transported by the gear always has some kinetic energy. The disengagement system may be practical for the movement of transport systems beneath the factory ceilings.

In a constant humid atmosphere electrical contacts are a problem for automatic doors, their installation and regulation usually being very difficult. In the friction gear of the present invention the continuous pivoting of the ring 5 under load is selected for contact operations in the end position of said ring 5. The electrical contacts are usually located inside the ring 5 where they are well protected with a short cable connection to the motor.

The best contacts in humid atmospheres are mercury switches which are operated by the degree of inclination of the overhead door. However the change of the angle may be very small for an open door in the horizontal position. The contact effect can in addition be produced by the increasing tensile load in the final position of the gear. Then no contact regulation is necessary on the overhead door. The tractive power in the open door position is very small, so that in the final condition of contact there is not much overload. In the drawing the mercury envelope 37 in the horizontal position of the door turns around the axle 37a in clockwise direction so that the mercury ball 37 at exactly the desired moment leaves the contact pair.

An overload contact 38 operates independently of the inclination of the overhead door 22. This contact is contacted by the ring 5 when tensile force increases too much in the rope end portion 8a, when the door is closing. For doors of low weight, contact 38 may also stop the motor in the vertical position of the door, acting as a final contact for closing.

In general, for the movement of an overhead door it is desirable no manual stress is needed to finally close the door. For this springs on the door produce a certain acceleration just before its vertical closed position. But this acceleration together with the door operating often produce mechanical interference of forces, so that it is difficult to correctly regulate the closing contact.

It is important that the door automatically closes without any significant noise and that the locking device actuates with full security. A locking device with horizontal rods better satisfies the increasing security requirements which in combination with a door operator is actuated by a lifting magnet. The special functions of the friction gear of the present invention achieve all these conditions.

The rope 8 can be made longer than this is necesssary for the movement of the door, because the springs 12 and 13 compensate. When the door accelerates the rope end portion 8a just before the vertical position of the door is reached, loses its tractive force. The reserve so obtained by the longer end portion 8a of the rope is shown by the removal of the axle 24 from the fixed point 14. The reserve of the rope end portion 8a in this way can be used for new traction. The door has in the interim reached a nearly vertical position.

The catch 39 has attached thereto a rope 41 passing through the guide 40 of the axle 24. This rope 41 is combined with the rods of the locking device of the door. With their own springs at the moment of closing the door the rods are in an open position. When now the motor produces a new tensile force in the rope 8, the catch 39 is moved substantially into position as shown in FIG. 1. During this additional movement the rods pull the door to the final position without any significant noise and then lock it by horizontal movement of the rods.

On reaching a vertical position of the door a mercury envelope similar to 37 may stop the motor because the envelope continues the inclination of the door plate opposite to the clockwise motion. The tractive force for the horizontal locking device is considerable because by the tensile force of pulley 10 the double of the tangential force of the ring 5 is produced. This means that for the contact effect in the vertical position the ring 5 pivots under a relatively small load.

The advantages of the gear of the present invention for use with continuous traction means for machines and apparatus respectively with a finite rope for a door operator are as follows:

1. The automatic pressure in the friction zone depends directly and exclusively on the tensile force at the driven ring.
2. Several possibilities exists for disengaging the friction coupling for both directions of rotation and a free wheel effect is possible.
3. The driven friction ring with its pivotability is able to control gear functions by electrical or mechanical means. The ring as the central element of the gear, is easy to change. Further, because the ring rolls on its inner surface stress due to friction remains relatively small.

With the gear of the present invention used as a door operator as described in the drawings it is well adapted to the particular conditions of operation. The large loop of the rope makes for essentially unlimited life for the rope. The friction connection of the rope on the ring stays constant. A special reduction gear with toothed wheels, additional bearings and a separate clutch are no longer necessary. The mercury envelope is not only dependent of the inclination of the door equipped with the gear. With a further power effect of the gear horizontal locking rods of the door can close the overhead door without any noise. In general therefore, the gear fundamentally simplifies door automation.

What is claimed:

1. A friction gear comprising a driven ring having an inside and outside surface, a drive pulley disposed within said drive ring, an elongated flexible tractive member extending around the outside surface of said drive ring with each of the end portions of said member for attachment to a fixed point, a pair of counter pulleys fixedly mounted adjacent the outside surface of the ring and peripherally spaced from each other, said driven ring being pivotable about said drive pulley with the inside surface of said ring in pressure contact with said drive pulley forming a friction zone by an increase in tension on either end of said member with the outside of said ring in contact with a corresponding one of said counter pulleys forming lever for automatically generating sufficient pressure in said friction zone for either of the two directions of rotation of said gear.

2. A gear as claimed in claim 1 in which the inside surface of the driven ring is covered by an elastic material.

3. A gear as claimed in claim 1 in which the tractive member is a rope, said rope being held in a groove in said outside surface of said ring by a tensile force in the rope.

4. A gear as claimed in claim 3 in which each of said end portions of said rope is provided with a spring to produce sufficient friction in said friction zone between said driving pulley and said inside surface of said ring for starting of said gear and increased friction between said rope and said groove.

5. A gear as claimed in claim 1 in which the counter pulleys are provided with elastic means whereby the pivoting of the ring about said drive pulley is increased on loading of said gear.

6. A gear as claimed in claim 1 including an intermediate ring disposed about one of said counter pulleys for movement by said driven ring, or appropriate pivoting thereof about said pulley to actuate an additional control device for said gears.

7. A gear as claimed in claim 1 including a limiting member for restricting the extent of pivoting of said ring in a particular direction under load whereby said ring slides when said gear is overloaded.

8. A gear as claimed in claim 1 including actuable means for reversing the pivoting of said ring about said drive pulley in a particular direction whereby to at least reduce the frictional coupling between said ring and said drive pulley in the friction zone.

9. A gear as claimed in claim 1 including means for lifting the ring into contact with both said counter pulleys whereby to disengage said gear.

* * * * *